United States Patent
Paik et al.

[11] Patent Number: 6,154,574
[45] Date of Patent: Nov. 28, 2000

[54] DIGITAL FOCUSING METHOD AND APPARATUS IN IMAGE PROCESSING SYSTEM

[75] Inventors: Joon Ki Paik, Seoul; Sang-ku Kim, Kyungki-do; Chul Ho Lee, Seoul, all of Rep. of Korea

[73] Assignee: Samsung Electronics Co., Ltd., Kyungki-do, Rep. of Korea

[21] Appl. No.: 09/143,306

[22] Filed: Aug. 28, 1998

[30] Foreign Application Priority Data

Nov. 19, 1997 [KR] Rep. of Korea ............... 97-61296

[51] Int. Cl.$^7$ ............................................. G06K 9/40
[52] U.S. Cl. ............... 382/255; 250/201.2; 348/345; 348/354
[58] Field of Search ........................... 382/254, 255, 382/276, 282; 250/201.2, 201.7; 348/345, 349, 354, 355

[56] References Cited

U.S. PATENT DOCUMENTS

| | | | |
|---|---|---|---|
| 5,172,236 | 12/1992 | Takemoto et al. | 348/355 |
| 5,570,433 | 10/1996 | Nagamine et al. | 382/255 |
| 5,710,829 | 1/1998 | Chen et al. | 382/255 |
| 6,067,114 | 5/2000 | Omata et al. | 348/345 |

*Primary Examiner*—Thomas D. Lee
*Attorney, Agent, or Firm*—F. Chau & Associates, LLP

[57] ABSTRACT

Digital focusing method and apparatus in an image processing system, for digitally focusing an out-of-focus image, are provided. A defocused image is divided into sub-images of a predetermined size. An edge direction of each of the divided sub-images is estimated. Step responses with respect to the respective edge directions are calculated. A mean step response is obtained by averaging a predetermined number of the step responses. Point Spread Function (PSF) coefficients are obtained using the mean step response. An image blur transfer function is obtained using the PSF coefficients. An image restoration transfer function is obtained using the image blur transfer function. An original in-focus image is obtained by multiplying the image restoration transfer function by the defocused image in a frequency domain. Thus, an image can be restored in real time, and the size and weight of the image processing system can be reduced.

21 Claims, 6 Drawing Sheets

DIGITAL FOCUSING METHOD AND APPARATUS IN IMAGE PROCESSING SYSTEM

BACKGROUND OF THE INVENTION

1. Field of the Invention

The present invention relates to an image processing system, and more particularly, to a digital focusing method and apparatus for restoring an original image by digitally focusing an out-of-focus image.

2. Description of the Related Art

The restoration of out-of-focus blurred image sequences is a very important part of an image processing system. Typically, a focusing apparatus in a conventional image processing system projects infrared rays onto an object and receives the infrared rays reflected from the object. The image processing system calculates the distance between the system and the object by measuring the time delay from when the infrared rays are projected to when the returned infrared rays reflected from the object is received. A focus distance is estimated from the calculated distance, and mechanical means is used to drive a focusing lens.

Even in the most advanced conventional focusing apparatus, in which digital signal processing is used to obtain an optimal focus distance and determines if an image is focused or not, the focusing apparatus must still mechanically drive a lens to reach an optimal focus state. Further, such focusing apparatuses cannot control the focus in real time, because the mechanical means for driving a lens requires a large time delay as compared to a nonmechanical device. As such, real time focusing of a fast moving object may not be possible. Further, the installation of an infrared device or a lens driving motor can be bulky and heavy.

Thus, it would be desirable to replace all or part of the mechanical movement of a focusing lens with a pure digital image processing technique. This has become more viable as current VLSI techniques and software techniques become speedy, highly integrated, inexpensive, and require low power.

SUMMARY OF THE INVENTION

It is an object of the present invention to provide a digital focusing apparatus and method in an image processing system, for electronically focusing an unfocused image in lieu of mechanical means.

There is provided a digital focusing method in an image processing system, comprising the steps of: dividing a defocused image into sub-images of a predetermined size; estimating an edge direction of each of the divided sub-images; calculating step responses with respect to the respective edge directions; obtaining a mean step response [S(X)] ($1 \leq X \leq R$) by averaging a predetermined number of the step responses (here, R is a radius of the PSF); obtaining Point Spread Function (PSF) coefficients ($a_0, a_1, \ldots a_{R-2}$ and $a_{R-1}$) using the mean step response wherein:

$$a_0 = \frac{S(R)}{Z} - 3a_R - 5a_{R-1} - \cdots - (2R-1)a_1$$

$$a_1 = \frac{S(R-1)}{Z} - 3a_R - 5a_{R-1} - \cdots - (2R-3)a_2$$

$$\vdots$$

$$a_{R-3} = \frac{S(3)}{Z} - 3a_R - 5a_{R-1}$$

$$a_{R-2} = \frac{S(2)}{Z} - 3a_R$$

$$a_{R-1} = \frac{S(1)}{Z}$$

(here, Z is a value obtained by subtracting a minimum value of the mean step response from a maximum value thereof); obtaining an image blur transfer function using the PSF coefficients; obtaining an image restoration transfer function using the image blur transfer function; and obtaining an in-focused image by multiplying the image restoration transfer function by the defocused image in a frequency domain.

There is also provided a digital focusing apparatus in an image processing system, comprising: a transfer function calculator for calculating PSF coefficients ($a_0, a_1, \ldots a_{R-2}$ and $a_{R-1}$) and calculating an image blur transfer function represented in a frequency domain, using the calculated coefficients:

$$a_0 = \frac{S(R)}{Z} - 3a_R - 5a_{R-1} - \cdots - (2R-1)a_1$$

$$a_1 = \frac{S(R-1)}{Z} - 3a_R - 5a_{R-1} - \cdots - (2R-3)a_2$$

$$\vdots$$

$$a_{R-3} = \frac{S(3)}{Z} - 3a_R - 5a_{R-1}$$

$$a_{R-2} = \frac{S(2)}{Z} - 3a_R$$

$$a_{R-1} = \frac{S(1)}{Z}$$

wherein R is a radius of the PSF and S(X) [$1 \leq X \leq R$] denotes a mean step response, and Z is a value obtained by subtracting a minimum value of the mean step response from a maximum value thereof; a first absolute value calculator for calculating the absolute value of the input image blur transfer function; a first squarer for receiving and squaring the absolute value of the blur transfer function; a complex conjugate calculator for calculating a complex conjugate of the input image blur transfer function; a second absolute value calculator for calculating the absolute value of a predetermined input operator; a second squarer for squaring the absolute value of the predetermined operator; a first multiplier for multiplying the output of the second squarer by a Lagrange multiplier; an adder for adding the output of the first multiplier to the output of the first squarer; a divider for dividing the output of the adder by the complex conjugate and outputting the result of the division as an image restoration transfer function; and a second multiplier for multiplying the image restoration transfer function by the out-of-focus image represented in the frequency domain, and outputting the product as an in-focused image.

BRIEF DESCRIPTION OF THE DRAWINGS

The above objects and advantage of the present invention will become more apparent by describing in detail a preferred embodiment thereof with reference to the attached drawings in which.

DESCRIPTION OF PREFERRED EMBODIMENTS

A basic theory of image restoration will now be described referring to FIG. 1 modeled by a two-dimensional linear space-invariant system.

Figure 1:
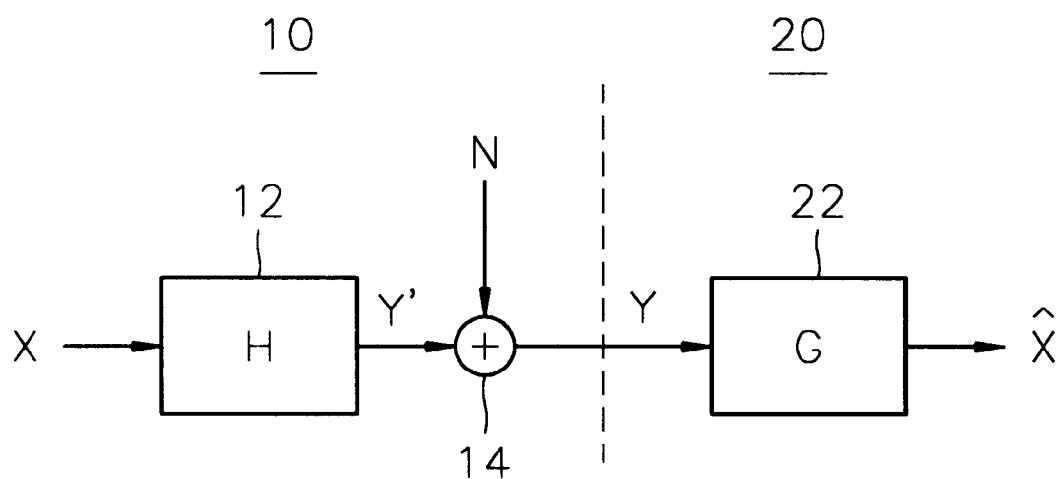
FIG. 1 shows a model illustrating an image degradation function and a restoration function.

FIG. 1 shows an image degradation system 10 for blurring the focus of an image, and a restoration system (or an image processing system) 20 for restoring the blurred focus.

An image blur unit 12 in the image degradation system 10 shown in FIG. 1 blurs the focus of an original image X, and outputs to an adder 14 an image Y' having a blurred focus which is represented in a frequency domain as shown in Equation 1:

$$Y'=X \cdot H. \quad (1)$$

wherein H denotes an image blur transfer function of the image blur unit 12.

Equation 1 can also be expressed as the convolution of the image blur transfer function and an original image x (here, x is obtained by expressing X in a spatial domain) in the spatial domain.

The adder 14 adds additive white Gaussian noise N to the signal Y' blurred by the image blur unit 12, and outputs the added result Y as an unfocused image observed by the image processing system 20.

Meanwhile, a digital focusing apparatus 22 according to an illustrative embodiment of the present invention in the image processing system 20 restores the observed image Y to an original image $\hat{X}$ expressed as:

$$\hat{X}=Y \cdot G=(Y'+N) \cdot G=(X \cdot H+N) \cdot G \quad (2)$$

wherein $\hat{X}$, Y and N are column vectors, and G is an image restoration transfer function of a digital focusing apparatus 22 and expressed as:

$$G = \frac{H^*}{|H|^2 + \lambda \cdot |C'|^2} \quad (3)$$

wherein H* is a complex conjugate of H, and C' is a transfer function of a linear high-pass filter. An example of C' is described in "Digital Image Processing" by Kenneth R. Castleman, Prentice-Hall, 1996:p397. In the text, C' is expressed as P(n,v). Also, λ, to be described later, is a Lagrange multiplier.

The aforementioned image restoration transfer function G will now be described.

The image restoration can be accomplished by performing an inverse procedure, based on the image degradation process shown in FIG. 1, on the observed blurred image Y, to give a result which is as close to the original image X as possible. Such an application of the inverse procedure is called an 'ill-posed problem'. This 'ill-posed problem' means that a bounded perturbation in an original image leads to an unbounded perturbation in a solution for restoring the image. Therefore, the restored image must be assumed in a direction where smoothness and roughness of an image are appropriately maintained in the solution. For this, in regularization theory of replacing the 'ill-posed problem' with a 'well-posed problem', a quadratic smoothing function [F(λ, x)] of the following Equation 4 is used to limit the norm of a smoothed region and a noise region in the solution domain.

$$F(\lambda, x)=\|y-Hx\|^2+\lambda\|C'x\|^2 \quad (4)$$

wherein a Lagrange multiplier λ controls weights between $\|y-Hx\|^2$ and $\|C'x\|^2$, and y is obtained by expressing Y in the spatial domain. That is, when the value of λ decreases, a noise component is amplified in the restored image, and when the value of λ increases, the restored image becomes increasingly smoother. Thus, an optimal λ for minimizing the function F(λ,x) must be determined. Here, when a predetermined λ is substituted into Equation 4 to minimize the function F(λ,x), the following Equation 5 is obtained:

$$F(x)=\tfrac{1}{2}x^T T'x - b^T x, \ 0 \le x_i \le 255, \ i=1, \ldots, L^2 \quad (5)$$

wherein $x^T$ denotes a transpose matrix of x, x is a column vector, $x_i$ represents an i-th element of the vector x, and the vector b and the matrix T' are expressed as:

$$b=H^T y, \ T'=H^T H+\lambda(C')^T C' \quad (6)$$

The matrix T' in the function F(x) is positive semidefinite, and to minimize the function F(x), x must satisfy the solution of a linear equation such as Equation 7. An example of the positive semidefinite can be found in "Linear Algebra and its Applications" by Gilbert Strang, 3rd ed. Saunders, 1988:p54.

$$T'x=b \quad (7)$$

Accordingly, x is equal to following Equation 8:

$$x=T'^{-1}b=(H^T H+\lambda(C')^T C')^{-1}H^T y \quad (8)$$

By applying the two-dimensional-DFT (Discrete Fourier Transform) to a block circulation matrix equation of the Equation 8, we have an image restoration transfer function expressed in Equation 3, i.e., a frequency response of a constrained least squares (CLS) filter.

An illustrative digital focusing method in an image processing system according to the present invention will now be described.

Figure 2:
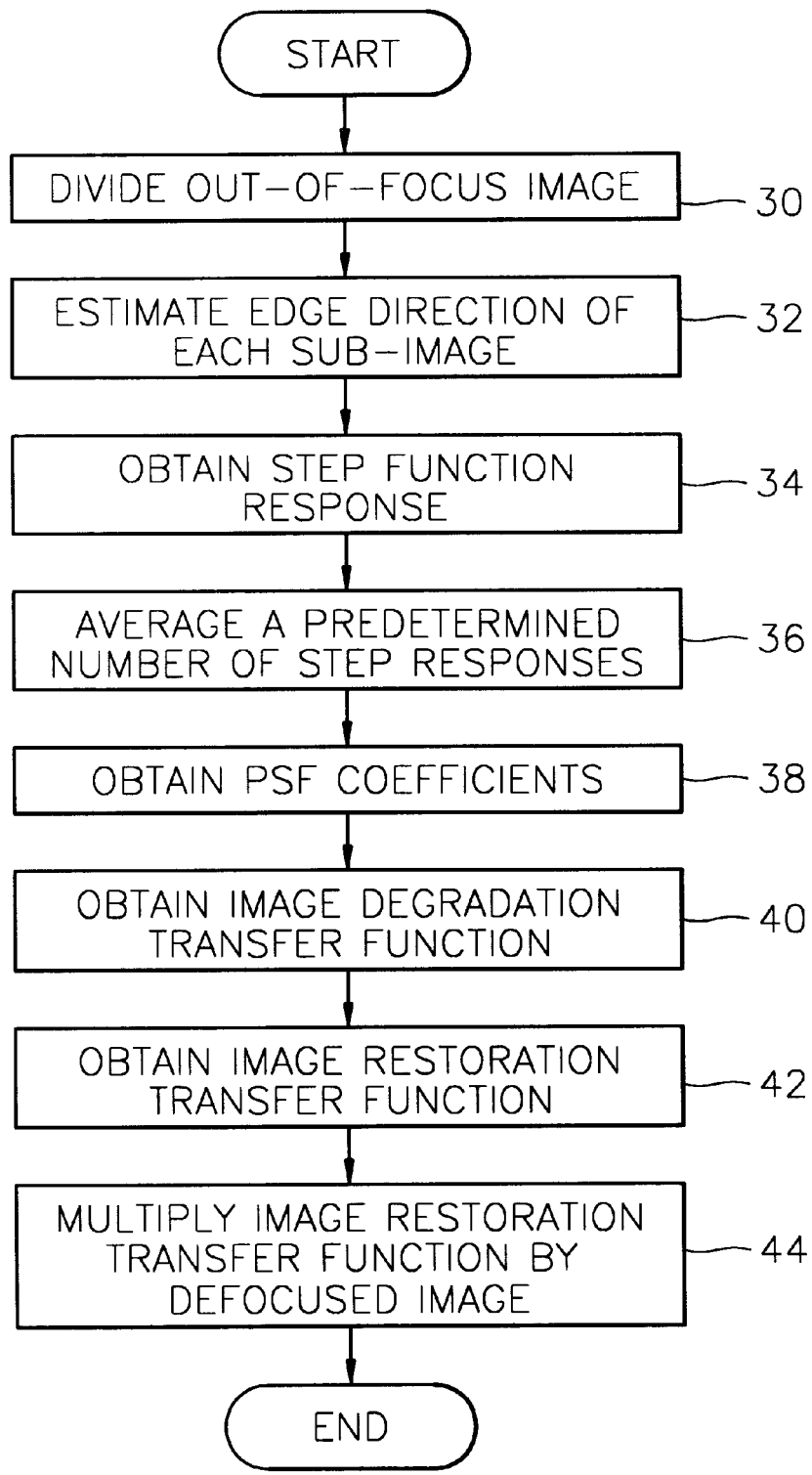
FIG. 2 is a flowchart illustrating a digital focusing method according to the present invention.

FIG. 2 is a flowchart of an illustrative digital focusing method according to the present invention, having steps 30 through 38, which obtain the coefficients of a Point-spread function using average step function responses, and steps 40 through 44, for digitally obtaining a focused image using the coefficients.

Two assumptions are made to describe the illustrative digital focusing method according to the present invention. The first one is that any input image must have an edge of an appropriate size in an arbitrary direction, which results from the boundary between the background and an object. The second is that the amount by which the image is out of focus must be the same along the circle of confusion (COC) and invariant in the entire input image.

The COC can be described as follows. The blurring phenomenon of an out-of-focus image occurs when the distance between an object and a camera plane is not appropriate, since one point on an object surface does not correspond to one point on the camera plane, i.e., to a focus position, but is instead diffused. This diffusion can closely resemble a phenomenon where a point source of light is projected in circular shape. This circle is called a circle of confusion (COC). This COC is generated when an image passed through an image processing system is not placed at an accurate focus distance, and the point source of light is projected in a shape of a diffusion circle when it is at a distance near the focus distance. When an image is blurred due to being out of focus, low-pass components of the image are emphasized. Accordingly, the amount by which the image out of focus is blurred can be recognized by the size of a high frequency component. The size of a high frequency component can be considered as the dispersion value of a degraded image passed through a high pass filter. That is, with an increase in the dispersion of the filtered high frequency component, the blur degree of an image decreases. In practice, in many conventional digital focusing apparatuses, the out-of-focus blur of an image is modeled as a two-dimensional Gaussian function having an appropriate dispersion value.

Under the two aforementioned assumptions, according to the illustrative digital focusing method according to the present invention, first, square sub-images are obtained by dividing an out-of-focus image of size B×B (here, B is a number of pixels) into subimages of size P×P (here, P is a number of pixels), in step 30. B can be a multiple of P.

After step 30, an edge direction with respect to each sub-image is estimated, in step 32. Generally, an edge means the boundary between two regions where brightness changes rapidly. In step 32, the edge can be classified using a block discrete cosine transform (BDCT). For this, it must be assumed that an image degradation process is linear space-invariant, or an image blur transfer function H is a block circulation structure as well as being a block Toeplitz matrix, and also assumed that an operator C' shown in Equation 3 is an operator of a block-adaptive high pass filter determined according to information of block-based classified edge directions. The block in 'block-based' denotes each sub-image described in step 30.

Figure 3:
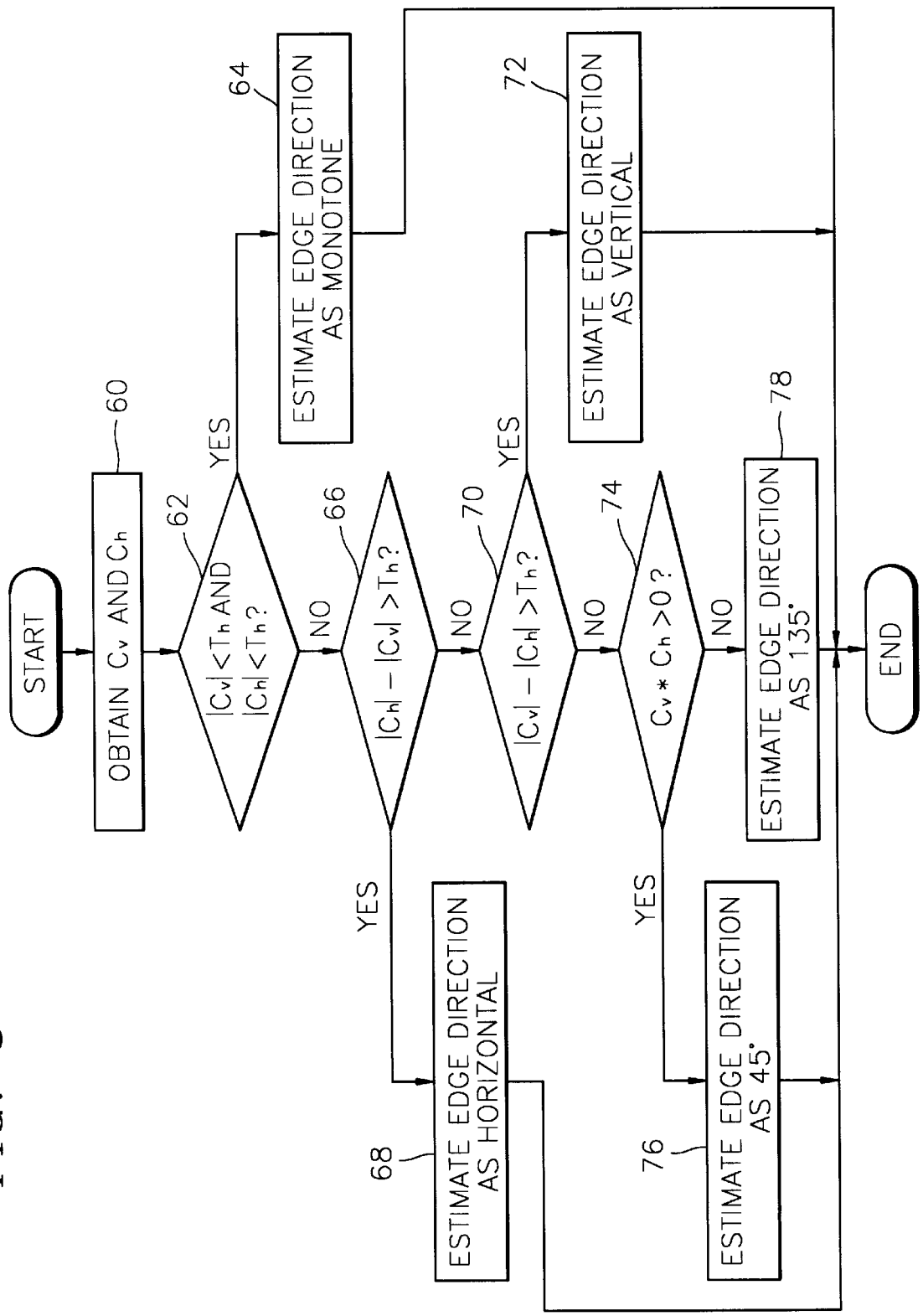
FIG. 3 is a flowchart illustrating a preferred embodiment of the step 32 shown in FIG. 2 of the present invention.
Figure 4A:
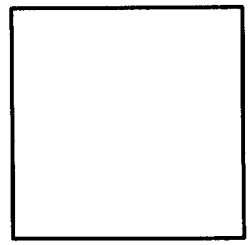
FIGS. 4A through 4E illustrate the shapes of classified edge directions.
Figure 4B:
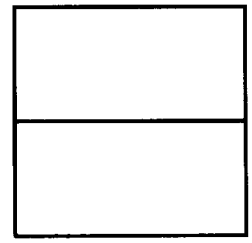
Figure 4C:
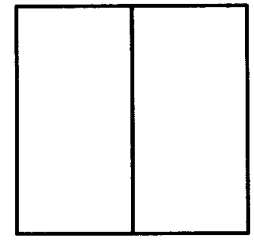
Figure 4D:
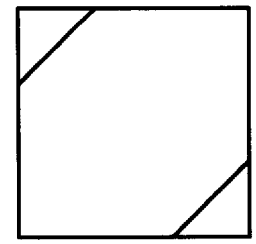
Figure 4E:
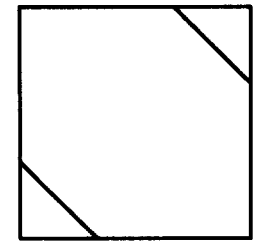

FIG. 3 is a flowchart illustrating a preferred embodiment of the present invention of step 32 of FIG. 2, which comprises step 60, calculating DCT coefficients, and steps 62 through 78, estimating an edge direction by comparing the DCT coefficients with a predetermined critical value. FIGS. 4A through 4E show the shapes of classified edge directions, wherein FIG. 4A shows a monotone edge, FIG. 4B shows a horizontal edge, FIG. 4C shows a vertical edge, FIG. 4D shows a 45° direction edge, and FIG. 4E shows 135° direction edge.

Referring to FIG. 3, two DCT coefficients Cv and Ch respectively representing the vertical and horizontal edges in a DCT block with respect to each divided sub-image are obtained, in step 60. Here, Equation 9 is a general expression for calculating DCT coefficients:

$$C(k_1, k_2) = \alpha(k_1) \cdot \alpha(k_2) \sum_{n_1=0}^{P-1} \sum_{n_2=0}^{P-1} x(n_1, n_2) \cdot \cos\left[\frac{\pi}{2P}k_1(2n_1+1)\right] \cdot \cos\left[\frac{\pi}{2P}k_2(2n_2+1)\right] \quad (9)$$

$$\alpha(k) = \frac{1}{\sqrt{P}}, \quad k = 0$$

provided that, $$\alpha(k) = \sqrt{2/P},$$

otherwise wherein a DCT coefficient $\{C(k_1,k_2)\}$ is a value representing by the extent which $(k_1,k_2)$th base function is included in P×P different base functions existing with respect to a corresponding DCT block $\{x(n_1,n_2)\}$ ($0 \leq n_1 \leq P-1$ and $0 \leq n_2 \leq P-1$). If P is equal to 8, 64 DCT coefficients are generated, and Cv and Ch representing (0,1)th and (1,0)th base functions among the 64 base functions are expressed as:

$$C_V = C(0,1) = \frac{\sqrt{2}}{8} \sum_{n_1=0}^{7} \sum_{n_2=0}^{7} x(n_1, n_2)\cos\left[\frac{\pi}{16}(2n_2+1)\right] \quad (10)$$

$$C_h = C(1,0) = \frac{\sqrt{2}}{8} \sum_{n_1=0}^{7} \sum_{n_2=0}^{7} x(n_1, n_2)\cos\left[\frac{\pi}{16}(2n_1+1)\right]$$

After step 60, it is determined whether absolute values |Cv| and |Ch| of Cv and Ch are each smaller than a predetermined critical or threshold value Th, in step 62. If both of |Cv| and |Ch| are smaller than Th, the edge direction is estimated to be a monotone in step 64 and as shown in FIG. 4A. However, if both of |Cv| and |Ch| are not smaller than Th, it is determined whether a value obtained by subtracting |Cv| from |Ch| is larger than Th, in step 66. If the value obtained by subtracting |Cv| from |Ch| is larger than Th, the edge direction is estimated to be horizontal in step 68 and as shown in FIG. 4B. Otherwise, it is determined whether a value obtained by subtracting |Ch| from |Cv| is larger than Th, in step 70. If the value obtained by subtracting |Ch| from |Cv| is larger than Th, the edge direction is estimated to be vertical, as shown in FIG. 4C, and in step 72. If the value obtained by subtracting |Ch| from |Cv| is not larger than Th, it is determined whether the product of Ch and Cv is positive, in step 74. If the product of Ch and Cv is positive, the edge direction is estimated to be 45°, as shown in FIG. 4D, and in step 76. Otherwise, the edge direction is estimated to be 135° as shown in FIG. 4E, in step 78. The aforementioned steps 60 through 78 are performed on each sub-image, i.e., based on blocks, so that edge directions of all the sub-images are estimated.

Figure 5A:
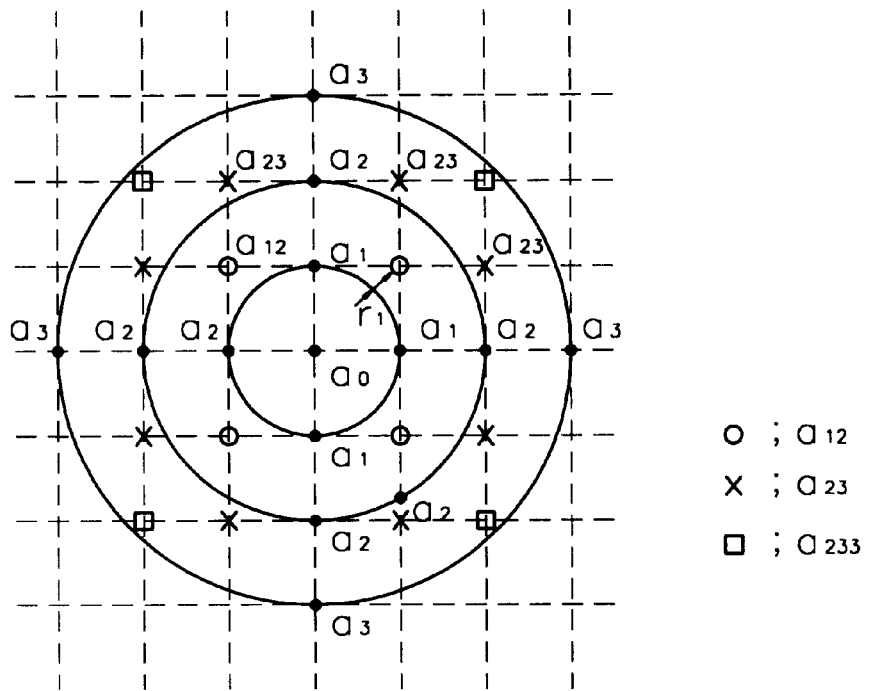
FIGS. 5A and 5B respectively illustrate a PSF having a radius of 2 and the response to a step function.
Figure 5B:
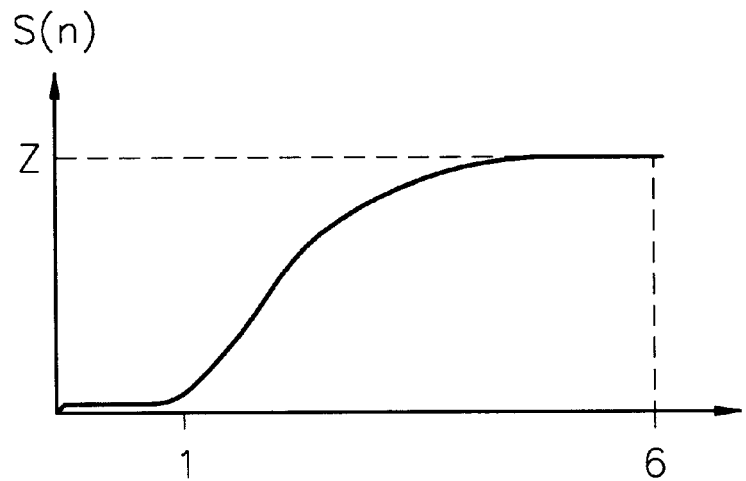

FIGS. 5A and 5B illustrate a Point-spread function PSF with radius R=3 and a step response, respectively. FIG. 5A illustrates a two-dimensional circular PSF, and FIG. 5B illustrates a corresponding one-dimensional step response. In FIG. 5B, the vertical axis denotes the level of luminance, and the horizontal axis denotes displacement.

Again referring to FIG. 2, after step 32, a step response $[S_A(n)]$ (here, A=1, 2, ... or $(B/P)^2$) existing perpendicular to the estimated edge direction is obtained with respect to each sub-image, in step 34. After step 34, the mean of a predetermined number of step responses is taken, as in the following Equation 11, and a mean step response [S(n)] is obtained, in step 36.

$$S(n) = \frac{1}{M} \sum_{A \in E} S_A(n), \quad n = -R, \cdots, R \quad (11)$$

wherein E denotes a collection of extracted edge directions, and M denotes a value not more than $(B/P)^2$, which is the number of sub-images whose edge directions have been measured. This is to average the step responses of M sub-images whose edge directions were extracted. The edge directions of certain sub-images may not be extracted.

Here, the mean step response is shown for 2R+1 at the horizontal axis shown in FIG. 5B.

After step 36, coefficients ($a_0$, $a_1$, ... and $a_{R-1}$) of two-dimensional circularly symmetric PSF as shown in FIG.

5A is obtained using a one-dimensional mean step response, as following Equation 12. Here, the coefficients from the center of the circle to the outside are $a_0, a_1, \ldots$ and $a_{R-1}$.

$$a_0 = \frac{S(R)}{Z} - 3a_R - 5a_{R-1} - \cdots - (2R-1)a_1$$

$$a_1 = \frac{S(R-1)}{Z} - 3a_R - 5a_{R-1} - \cdots - (2R-3)a_2$$

$$\vdots$$

$$a_{R-3} = \frac{S(3)}{Z} - 3a_R - 5a_{R-1}$$

$$a_{R-2} = \frac{S(2)}{Z} - 3a_R$$

$$a_{R-1} = \frac{S(1)}{Z}$$

(12)

wherein Z is a value obtained by subtracting a minimum value of the mean step response from a maximum value thereof.

After step 38, an image blur transfer function h, i.e., a Point-spread function (PSF), in a spatial domain, is obtained using the coefficients of the PSF, as in following Equation 13, in step 40:

$$h = \frac{1}{\Sigma} \begin{bmatrix} a_0 & a_1 & a_2 & a_3 & \cdots & 0 & a_3 & a_2 & a_1 \\ a_1 & a_{12} & a_{23} & 0 & \cdots & 0 & 0 & a_{23} & a_{12} \\ a_2 & a_{23} & a_{233} & 0 & \cdots & 0 & 0 & a_{233} & a_{23} \\ a_3 & 0 & 0 & 0 & \cdots & 0 & 0 & 0 & 0 \\ \vdots & \vdots & \vdots & \vdots & \cdots & \vdots & \vdots & \vdots & \vdots \\ a_2 & a_{23} & a_{233} & 0 & \cdots & 0 & 0 & a_{233} & a_{23} \\ a_1 & a_{12} & a_{23} & 0 & \cdots & 0 & 0 & a_{23} & a_{12} \end{bmatrix}$$

(13)

wherein, as shown in FIG. 5A, $a_{23}$ denotes a value closer to $a_2$ than $a_3$, $a_{233}$ denotes a value closer to $a_3$ than $a_2$, h has size B×B, $a_{12}$ is equal to $\alpha_1 \cdot a_1 + (1-\alpha_1) \cdot a_2$, and $a_{23}$ is equal to $\alpha_2 \cdot a_2 + (1-\alpha_2) \cdot a_3$. That is, $a_{mn}$ is equal to $\alpha_m \cdot a_m + (1-\alpha_m) \cdot a_n$ ($1 \leq m \leq R-1$, n=m+1). Here, $\alpha_1, \alpha_2, \ldots, \alpha_{m-1}$ and $\alpha_{lm}$ are weighted values, greater than 0 and smaller than 1. For example, $\alpha_1$ is inversely proportional to $r_1$ shown in FIG. 5A. Meanwhile, $\Sigma$ denotes a sum of the PSF coefficients.

After step 40, an image blur transfer function H is obtained by performing two-dimensional Discrete Fourier Transform (DFT) on the transfer function h, and an image restoration transfer function G is obtained by substituting the image blur transfer function H in Equation 3, in step 42. After step 42, the image restoration transfer function G in a frequency domain is multiplied by an out-of-focus image signal Y in the frequency domain, to obtain an image signal $\hat{X}$ having a restored focus in the frequency domain, in step 44. Here, a restored image signal $\hat{x}$ is obtained by performing an inverse DFT (IDFT) on $\hat{X}$. Also, the restored image signal $\hat{x}$ can be obtained by convoluting an impulse response (g) of an image restoration filter 22, in the spatial domain, obtained by inversely discrete-Fourier-transforming the transfer function G, with an out-of-focus image signal (y) in the spatial domain.

The configuration and operation of the digital focusing apparatus in the illustrative embodiment of the image processing system according to the present invention, which performs the above-described digital focusing method, will now be described.

Figure 6:
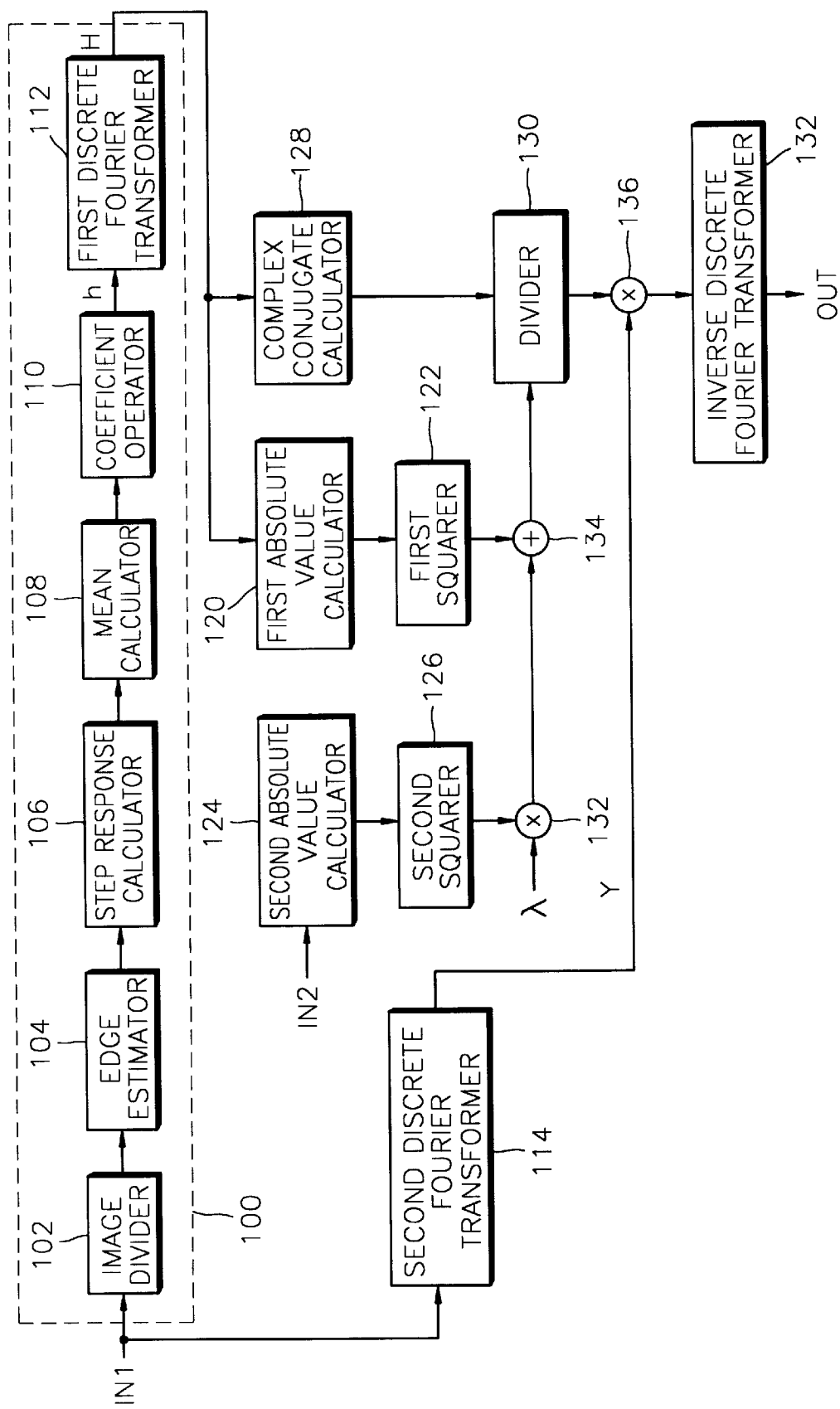
FIG. 6 is a block diagram of a preferred embodiment of a digital focusing apparatus according to the present invention.

FIG. 6 is a block diagram illustrating a preferred embodiment of a digital focusing apparatus according to the present invention. As shown in FIG. 6, the digital focusing apparatus is comprised of a transfer function calculator 100, first and second absolute value calculators 120 and 124, first and second squarers 122 and 126, a complex conjugate calculator 128, a divider 130, first and second multipliers 132 and 136, an adder 134, a second Discrete Fourier Transformer 114 and an Inverse Discrete Fourier Transformer 132. The transfer function calculator 100 includes an image divider 102, an edge estimator 104, a step response calculator 106, a mean calculator 108, a coefficient operator 110 and a first Discrete Fourier Transformer 112.

The digital focusing apparatus shown in FIG. 6 is a block diagram version of the components of the digital focusing apparatus 22 shown in FIG. 1. The transfer function calculator 100 calculates the image blur transfer function H expressed in the frequency domain, using the PSF coefficients ($a_0, a_1, \ldots a_{R-2}$ and $a_{R-1}$) in Equation 12. For this, the image divider 102 divides the out-of-focus image signal y input via an input port IN1 into sub-images of size P×P, and outputs the divided sub-images to the edge estimator 104. The edge estimator 104 estimates an edge direction of each sub-image using the aforementioned method in step 32, and outputs the estimated edge directions to the step response calculator 106. The step response calculator 106 calculates step responses with respect to M estimated edge directions input from the edge estimator 104, and outputs the calculated step responses to the mean calculator 108.

The mean calculator 108 calculates the mean of the step responses as expressed in Equation 11, and outputs the calculated mean step response to the coefficient operator 110. The coefficient operator 110 receives the mean step response, calculates the PSF coefficients of Equation 12 using the received mean step response, and outputs an image blur transfer function (h) in a spatial domain, expressed as Equation 13 and obtained from the calculated coefficients, to the first Discrete Fourier Transformer 112. The first Discrete Fourier Transformer 112 performs a two-dimensional Discrete Fourier Transform on the image blur transfer function (h) in the spatial domain, to obtain an image blur transfer function (H) in a frequency domain, and outputs the image blur transfer function (H) to the first absolute value calculator 120 and the complex conjugate calculator 128.

The first absolute value calculator 120 calculates an absolute value of the input image blur transfer function (H), and outputs the calculated absolute value |H| of the image blur transfer function to the first squarer 122. The first squarer 122 receives and squares |H|, and outputs the squared result to the adder 134. The complex conjugate calculator 128 calculates a complex conjugate H* of the image blur transfer function H received from the transfer function calculator 100, and outputs the calculated complex conjugate H* to the divider 130.

Meanwhile, the second absolute value calculator 124 calculates an absolute value |C'| of a predetermined operator C' of a linear high pass filter mentioned in the description of Equation 3, which is input via an input port IN2, and outputs the result to the second squarer 126. The second squarer 126 squares |C'|, and outputs the squared result to the first multiplier 132. The first multiplier 132 multiplies the output of the second squarer 126 by a Lagrange multiplier λ, and outputs the product to the adder 134. The adder 134 adds the output of the first squarer 122 to the output of the first multiplier 132, and outputs the result of the addition to the divider 130. The divider 130 divides the complex conjugate H* output from the complex conjugate calculator 128 by the result of the addition of the adder 134, and outputs the result of the division to the second multiplier 136.

Here, the second Discrete Fourier Transformer 114 performs a two-dimensional Discrete Fourier Transform on the defocused image signal y in a spatial domain, input via the input port IN1, and obtains the image signal Y in the frequency domain. The second multiplier 136 multiplies the image restoration transfer function G of Equation 3, being the result of the division by the divider 130, by the defocused image signal Y in the frequency domain output from the second Discrete Fourier Transformer 114, and outputs the product to the Inverse Discrete Fourier Transformer 138. The Inverse Discrete Fourier Transformer 132 performs a two-dimensional Inverse Discrete Fourier Transform on the product of the second multiplier 136, and outputs the transformed signal as a focus-restored image signal $\hat{x}$ via an output port OUT. As can be readily apparent to one ordinarily skilled in the art, the components of FIG. 6 can be realized by hardware circuitry as shown, or by equivalent software modules stored in a general purpose computer having associated memory and executed by a processor (not shown).

As can be seen, in the digital focusing method and apparatus according to the illustrative embodiment of the present invention, a novel approach is shown in estimating the image degradation system 10 by searching for an edge component of a blurred input image and then analyzing a step response, preferably by using the detected edges of blurred sub-images on the basis of block, and the tilt and distribution of the step response were observed, whereby the size and shape of a point-spread function PSF (h) are estimated. The estimated PSF is applied to an image restoration transfer function to restore an image. The restored image is considered to be an in-focus image. The present invention can be applied to an image processing system such as a computer vision system, a microscope, a video camera, a camcorder, etc.

Advantageously, the illustrative digital focusing method and apparatus in an image processing system according to the present invention can adjust the focus of an image electronically or digitally, as opposed to a conventional method of mechanically adjusting the focus of an image, such as by using an infrared device or a lens driving motor. For example, a defocused image can be digitally focused using the illustrative method or apparatus according to the present invention in less than 100 milliseconds. First, an edge direction of each sub-image is estimated, in less than 100/3 milliseconds. Next the, the PSF coefficients and the image restoration transfer function are obtained in less than 100/3 milliseconds. Last, it takes less than 100/3 milliseconds for image restoration filtering. Here, the frames of the image are input to the apparatus according to the present invention at intervals of less than 100/3 milliseconds. Of course, the defocused image can be digitally focused in 50 milliseconds when the image is input to the apparatus every one field. As such, real-time focusing using the present invention is achieved, and the size and weight of the image processing system is reduced.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A digital focusing method in an image processing system, comprising the steps of:
    dividing a defocused image into sub-images of a predetermined size;
    estimating an edge direction of each of the divided sub-images;
    calculating step responses for respective edge directions;
    obtaining a mean step response by averaging a predetermined number of the step responses;
    obtaining Point Spread Function (PSF) coefficients using the mean step response;
    obtaining an image blur transfer function using the PSF coefficients;
    obtaining an image restoration transfer function using the image blur transfer function; and
    obtaining an in-focused image by multiplying the image restoration transfer function by the defocused image in a frequency domain.

2. The method according to claim 1, wherein said PSF coefficients are:

$$a_0 = \frac{S(R)}{Z} - 3a_R - 5a_{R-1} - \cdots - (2R-1)a_1$$

$$a_1 = \frac{S(R-1)}{Z} - 3a_R - 5a_{R-1} - \cdots - (2R-3)a_2$$

$$\vdots$$

$$a_{R-3} = \frac{S(3)}{Z} - 3a_R - 5a_{R-1}$$

$$a_{R-2} = \frac{S(2)}{Z} - 3a_R$$

$$a_{R-1} = \frac{S(1)}{Z}$$

wherein R is a radius of the PSF, Z is a value obtained by subtracting a minimum value of the mean step response from a maximum value thereof.

3. The method according to claim 2, wherein said step of obtaining an image blur transfer function includes arranging the coefficients of the PSF in a spatial domain:

$$h = \frac{1}{\Sigma} \begin{bmatrix} a_0 & a_1 & a_2 & a_3 & \cdots & 0 & a_3 & a_2 & a_1 \\ a_1 & a_{12} & a_{23} & 0 & \cdots & 0 & 0 & a_{23} & a_{12} \\ a_2 & a_{23} & a_{233} & 0 & \cdots & 0 & 0 & a_{233} & a_{23} \\ a_3 & 0 & 0 & 0 & \cdots & 0 & 0 & 0 & 0 \\ \vdots & \vdots & \vdots & \vdots & \cdots & \vdots & \vdots & \vdots & \vdots \\ a_2 & a_{23} & a_{233} & 0 & \cdots & 0 & 0 & a_{233} & a_{23} \\ a_1 & a_{12} & a_{23} & 0 & \cdots & 0 & 0 & a_{23} & a_{12} \end{bmatrix} \quad (13)$$

and;
    performing DFT on h.

4. The method according to claim 3 wherein said step of obtaining image restoration transfer function G is by:

$$G = \frac{H^*}{|H|^2 + \lambda \cdot |C'|^2} \quad (3)$$

wherein H is said image blur transfer function, H* is a complex conjugate of H and C' is a function of a linear high pass filter.

5. The method according to claim 4, wherein said image is focused by inversely discrete-Fourier-transforming G, with an out-of-focus image signal.

6. The method according to claim 1, wherein said defocused image is focused in real time.

7. The method according to claim 1, wherein said step of estimating edge direction comprises the substeps of:
    (a1) obtaining two discrete cosine transform coefficients Cv and Ch respectively representing vertical and horizontal edges;

(a2) determining whether the absolute values of Cv and Ch are both smaller than a predetermined critical value Th;

(a3) estimating the edge direction to be monotonous if the absolute values of Cv and Ch are both smaller than the predetermined critical value Th;

(a4) determining whether a value obtained by subtracting the absolute value of Cv from the absolute value of Ch is larger than Th, if the absolute values of Cv and Ch are not both smaller than the predetermined critical value Th;

(a5) estimating the edge direction to be horizontal if the result of the subtraction of step (a4) is lager than Th;

(a6) determining whether a value obtained by subtracting the absolute value of Ch from the absolute value of Cv is larger than Th, if the value of the subtraction of step (a4) is no larger than Th;

(a7) estimating the edge direction to be vertical if the result of the subtraction in step (a6) is larger than Th;

(a8) determining whether the product of Ch and Cv is positive, if the result of the subtraction in step (a6) is not larger than Th;

(a9) estimating the edge direction to be 45°, if the product in step (a8) is positive; and (a10) estimating the edge direction to be 135°, if the product in step (a8) is not positive, wherein the steps (a1) through (a10) are performed on each of the sub-images.

8. The method according to claim 1, wherein said step of estimating edge direction includes calculating DCT coefficients Cv and Cn for vertical and horizontal edges, respectively.

9. The method according to claim 8, further including the step of classifying edge directions into one of monotone, horizontal, vertical and angular directions by comparing mathematical functions of Cv and Cn to predetermined thresholds.

10. An image processing device having a processor and associated memory, comprising:

means for dividing a defocused image into sub-images of a predetermined size;

means for estimating an edge direction of each of the divided sub-images;

means for calculating step responses for respective edge directions; and means for obtaining a mean step response by averaging a predetermined number of the step responses, obtaining Point Spread Function (PSF) coefficients using the mean step response, obtaining an image blur transfer function using the PSF coefficients, obtaining an image restoration transfer function using the image blur transfer function, and obtaining an in-focused image by multiplying the image restoration transfer function by the defocused image in a frequency domain.

11. The device according to claim 10, wherein said PSF coefficients are:

$$a_0 = \frac{S(R)}{Z} - 3a_R - 5a_{R-1} - \cdots - (2R-1)a_1$$

$$a_1 = \frac{S(R-1)}{Z} - 3a_R - 5a_{R-1} - \cdots - (2R-3)a_2$$

$$\vdots$$

$$a_{R-3} = \frac{S(3)}{Z} - 3a_R - 5a_{R-1}$$

$$a_{R-2} = \frac{S(2)}{Z} - 3a_R$$

$$a_{R-1} = \frac{S(1)}{Z}$$

wherein R is a radius of the PSF, Z is a value obtained by subtracting a minimum value of the mean step response from a maximum value thereof.

12. The device according to claim 11, wherein said means for obtaining an image blur transfer function includes means for arranging the coefficients of the PSF in a spatial domain:

$$h = \frac{1}{\Sigma} \begin{bmatrix} a_0 & a_1 & a_2 & a_3 & \cdots & 0 & a_3 & a_2 & a_1 \\ a_1 & a_{12} & a_{23} & 0 & \cdots & 0 & 0 & a_{23} & a_{12} \\ a_2 & a_{23} & a_{233} & 0 & \cdots & 0 & 0 & a_{233} & a_{23} \\ a_3 & 0 & 0 & 0 & \cdots & 0 & 0 & 0 & 0 \\ \cdots & \cdots & \cdots & \cdots & \cdots & \cdots & \cdots & \cdots & \cdots \\ a_2 & a_{23} & a_{233} & 0 & \cdots & 0 & 0 & a_{233} & a_{23} \\ a_1 & a_{12} & a_{23} & 0 & \cdots & 0 & 0 & a_{23} & a_{12} \end{bmatrix} \quad (13)$$

and;

performing DFT on h.

13. The device according to claim 12 wherein said means for obtaining image restoration transfer function G is by:

$$G = \frac{H^*}{|H|^2 + \lambda \cdot |C'|^2} \quad (3)$$

wherein H is said image blur transfer function, H* is a complex conjugate of H and C' is a function of a linear high pass filter.

14. The device according to claim 13, further including means for inversely discrete-Fourier-transforming G with an out-of-focus image signal for outputting a focused image.

15. The device according to claim 10, wherein said defocused image is focused in real time.

16. The device according to claim 10, wherein said defocused image is focused in less than 100 milliseconds.

17. The device according to claim 10, wherein said means for estimating edge direction includes means for calculating DCT coefficients Cv and Cn for vertical and horizontal edges, respectively.

18. The device according to claim 17, wherein said means for estimating edge direction further includes means for classifying edge directions into one of monotone, horizontal, vertical and angular directions by comparing mathematical functions of Cv and Cn to predetermined thresholds.

19. An image focusing device comprising:

a transfer function calculator for calculating PSF coefficients and calculating an image blur transfer function represented in a frequency domain;

a first absolute value calculator for calculating the absolute value of the input image blur transfer function;

a first squarer for squaring the absolute value of the blur transfer function;

a complex conjugate calculator for calculating a complex conjugate of the image blur transfer function;

a second absolute value calculator for calculating the absolute value of a predetermined input operator;

a second squarer for squaring the absolute value of the predetermined operator;

a first multiplier for multiplying the output of the second squarer by a Lagrange multiplier;

an adder for adding the output of the first multiplier to the output of the first squarer;

a divider for dividing the output of the adder by the complex conjugate and outputting an image restoration transfer function; and a second multiplier for multiplying the image restoration transfer function by an out-of-focus image represented in the frequency domain, and outputting the product as an in-focused image.

20. The device according to claim 19, wherein said PSF coefficients are:

$$a_0 = \frac{S(R)}{Z} - 3a_R - 5a_{R-1} - \cdots - (2R-1)a_1$$

$$a_1 = \frac{S(R-1)}{Z} - 3a_R - 5a_{R-1} - \cdots - (2R-3)a_2$$

$$\vdots$$

$$a_{R-3} = \frac{S(3)}{Z} - 3a_R - 5a_{R-1}$$

$$a_{R-2} = \frac{S(2)}{Z} - 3a_R$$

$$a_{R-1} = \frac{S(1)}{Z}$$

wherein R is a radius of the PSF and S(X) [$1 \leq X \leq R$] denotes a mean step response, and Z is a value obtained by subtracting a minimum value of the mean step response from a maximum value thereof.

21. The device according to claim 20, wherein said out-of-focus image is outputted as in-focused image in real time.

* * * * *